(12) United States Patent
Wakayama

(10) Patent No.: US 7,999,806 B2
(45) Date of Patent: Aug. 16, 2011

(54) THREE-DIMENSIONAL SHAPE DRAWING DEVICE AND THREE-DIMENSIONAL SHAPE DRAWING METHOD

(75) Inventor: Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 941 days.

(21) Appl. No.: 10/584,063

(22) PCT Filed: Jun. 8, 2005

(86) PCT No.: PCT/JP2005/010500
§ 371 (c)(1),
(2), (4) Date: Jun. 22, 2006

(87) PCT Pub. No.: WO2006/011307
PCT Pub. Date: Feb. 2, 2006

(65) Prior Publication Data
US 2009/0027389 A1 Jan. 29, 2009

(30) Foreign Application Priority Data
Jul. 23, 2004 (JP) .................................. 2004-215239

(51) Int. Cl.
*G06T 15/00* (2011.01)
(52) U.S. Cl. ...................................................... 345/422
(58) Field of Classification Search ........................ None
See application file for complete search history.

(56) References Cited

U.S. PATENT DOCUMENTS

| | | | |
|---|---|---|---|
| 5,043,923 A * | 8/1991 | Joy et al. ........................ | 345/536 |
| 5,301,263 A * | 4/1994 | Dowdell ........................ | 345/422 |
| 5,465,371 A | 11/1995 | Fujii et al. | |
| 5,551,019 A | 8/1996 | Izawa et al. | |
| 5,808,617 A * | 9/1998 | Kenworthy et al. .......... | 345/421 |
| 5,926,181 A * | 7/1999 | Lewis et al. .................... | 345/421 |
| 6,052,125 A * | 4/2000 | Gardiner et al. ............... | 345/421 |
| 6,160,557 A * | 12/2000 | Narayanaswami ........... | 345/422 |
| 6,411,290 B1 * | 6/2002 | Sasaki ........................... | 345/418 |
| 6,677,945 B2 * | 1/2004 | Lapidous et al. ............. | 345/422 |
| 6,680,737 B2 * | 1/2004 | Ashburn et al. ............... | 345/531 |
| 7,030,887 B2 * | 4/2006 | Andrews ....................... | 345/592 |
| 2001/0028354 A1 * | 10/2001 | Cheng et al. .................. | 345/531 |

(Continued)

FOREIGN PATENT DOCUMENTS

JP 62-042281 2/1987

(Continued)

*Primary Examiner* — Ulka Chauhan
*Assistant Examiner* — Andrew G Yang
(74) *Attorney, Agent, or Firm* — Wenderoth Lind & Ponack, L.L.P.

(57) ABSTRACT

A device drawing a three-dimensional shape and including a high order bit comparing section comparing high order bits of a depth value retained by a high order Z-buffer memory with high order bits calculated by a calculation section. If these two sets of high order bits are the same, a low order bit comparing section compares low order bits retained by a low order Z-buffer memory with low order bits calculated by the calculation section. If a depth indicated by the high order bits calculated by the calculation section is shallow, the high order bits retained by the high order Z-buffer memory and the low order bits retained by the low order Z-buffer memory are updated. If a depth indicated by the low order bits calculated by the calculation section is shallow, the low order bits retained by the low order Z-buffer memory are updated.

10 Claims, 6 Drawing Sheets

U.S. PATENT DOCUMENTS

2003/0160788 A1 * 8/2003 Buehler ......................... 345/422

FOREIGN PATENT DOCUMENTS

| JP | 01-244585 | 9/1989 |
| JP | 1-244585 | 9/1989 |
| JP | 05-189203 | 7/1993 |
| JP | 06-195198 | 7/1994 |
| JP | 08-161526 | 6/1996 |
| JP | 10-49705 | 2/1998 |
| JP | 10-049705 | 2/1998 |

* cited by examiner

THREE-DIMENSIONAL SHAPE DRAWING DEVICE AND THREE-DIMENSIONAL SHAPE DRAWING METHOD

BACKGROUND OF THE INVENTION

1. Field of the Invention

The present invention relates to a three-dimensional shape drawing device and a three-dimensional shape drawing method, and more particularly to a three-dimensional shape drawing device and a three-dimensional shape drawing method for drawing a three-dimensional shape by using Z buffer algorithm using a depth value from a viewpoint.

2. Description of the Related Art

There have been three-dimensional shape displaying devices for drawing a three-dimensional shape by using a Z buffer algorithm as a hidden surface removal system. Also, there have been techniques for increasing a speed of drawing processing of such a three-dimensional shape displaying device, for example, a technique in which each pixel contains one bit flag memory (e.g., patent document 1) and a technique which uses a degenerated Z buffer for, among a plurality of depth values of pixels, storing a depth value of a farthest pixel from a view point and a depth value of a nearest pixel from the view point (e.g., patent document 2).

FIG. 7 is a block diagram showing a configuration of a three-dimensional shape drawing device 200 described in the patent document 2. FIG. 8 is a diagram schematically showing a screen 214 for displaying a three-dimensional shape drawn by the three-dimensional shape drawing device 200 shown in FIG. 7 and a configuration of a ZR buffer 205.

In FIG. 7, an image supply section 208 supplies, to a pixel drawing section 209 and a drawing determination section 210 of an image composing section 201, data of a polygon (hereinafter, referred to as polygon data) to be drawn. The image composing section 201 converts the polygon data into pixel data.

As shown in FIG. 8, the screen 214 is divided into M×N blocks. A block 213 being a portion of a divided image signal comprises K×L pixels. The ZR buffer 205 retains a MAXZ and a MINZ of each of the blocks.

A Z main buffer 206 stores all Z values (depth values) The ZR buffer 205 retains a maximum Z value (MAXZ) 211 and a minimum Z value (MINZ) 212 of each of the blocks shown in FIG. 8.

The pixel drawing section 209 outputs, to a drawing determination section 210, a Z value of a pixel to be drawn, and also outputs X and Y coordinates indicating a position of the pixel. Based on either only the Z values retained by the ZR buffer 205 or both the Z values retained by the ZR buffer 205 and the Z values retained by the Z main buffer 206, the drawing determination section 210 determines whether or not to draw the pixel.

A frame buffer 203 retains the pixel which has been determined, by the determination section 210, to be drawn. A palette circuit 204 converts data of the pixel retained by the frame buffer 203 into brightness data indicating actual brightness. The palette circuit 204 supplies, to a display section 207, image to be displayed.

When the conventional three-dimensional shape drawing device described in the patent document 2 draws a new three-dimensional shape, the MAXZ 211 and MINZ 212 of the block 213 of the screen 214 are compared with a Z value of the pixel to be newly drawn. If the Z value of the pixel to be newly drawn is greater than the MAXZ 211, the three-dimensional shape drawing device 200 terminates drawing the pixel.

On the other hand, if the Z value of the pixel to be newly drawn is smaller than the MINZ 212, the three-dimensional shape drawing device 200 writes a new Z value in the Z main buffer 206, and writes a new pixel value in the frame buffer 203. Further, the three-dimensional shape drawing device 200 overwrites the MINZ 212 with the new Z value.

If the Z value of the pixel to be newly drawn is between the MINZ 212 and MAXZ 211, the three-dimensional shape drawing device 200 refers to the Z main buffer 206, and compares the Z value of the pixel to be drawn with a Z value retained by the Z main buffer 206.

If the Z value of the pixel to be newly drawn is smaller than the Z value retained by the Z main buffer 206, the three-dimensional shape drawing device 200 overwrites the Z value retained by the Z main buffer 206 with a new Z value. Then, the three-dimensional shape drawing device 200 checks, among the Z values retained by the Z main buffer 206, all Z values belonging to the block 213, and then sets a greatest Z value among all the Z values belonging to the block 213 as the MAXZ 211.

As described above, the conventional three-dimensional shape drawing device described in the patent document 2 accesses the Z main buffer 206 only when the Z value of the pixel to be newly drawn is between the maximum Z value and the minimum Z value of the block in which the pixel is positioned. As a result, the frequency of accessing the Z main buffer 206 is reduced.

[Patent Document 1] Japanese Laid-Open Patent Publication No. 62-42281

[Patent Document 2] Japanese Laid-Open Patent Publication No. 8-161526 (pages 5-7, FIGS. 1 and 4)

BRIEF SUMMARY OF THE INVENTION

However, while the conventional three-dimensional shape drawing device described in the patent document 2 is capable of eliminating the necessity to refer to the Z main buffer for every pixel, the conventional three-dimensional shape drawing device is still required to read all Z values within a block in order to determine a value to be the maximum Z value when the maximum Z value retained in the ZR buffer is updated. Moreover, when performing a calculation to determine the maximum value, the conventional device cannot process a next pixel. This interrupts drawing processing of the device. As a result, the device cannot draw a three-dimensional shape at a high speed.

Therefore, an object of the present invention is to provide a three-dimensional shape drawing device and a three-dimensional shape drawing method which are capable of drawing a three-dimensional shape at a high speed.

The present invention is a three-dimensional shape drawing device for drawing a three-dimensional shape by using Z buffer algorithm, the three-dimensional shape drawing device comprising: a depth value calculation section for calculating a depth value of a pixel to be drawn; a high order Z-buffer memory for retaining high order bits of a depth value of a pixel to be displayed as a front face, the depth value being among depth values having been calculated by the depth value calculation section; a low order Z-buffer memory for retaining low order bits of the depth value of the pixel to be displayed as the front face, the depth value being among the depth values having been calculated by the depth value calculation section; a high order bit comparing section for reading the high order bits retained by the high order Z-buffer memory and comparing the high order bits with high order bits of the depth value calculated by the depth value calculation section; a low order bit comparing section for, when a result of a comparison performed by the high order bit comparing section shows that the high order bits of the depth value calculated by the depth value calculation section have a same value as that of the high order bits of the depth value retained by the high order Z-buffer memory, reading the low order bits of the depth value retained by the low order Z-buffer memory and comparing the low order bits with low order bits of the depth value calculated by the depth value calculation section; and a record update section for, when the result of the comparison performed by the high order bit comparing section shows that a depth indicated by the high order bits of the depth value calculated by the depth value calculation section is shallower than a depth indicated by the high order bits of the depth value retained by the high order Z-buffer memory, updating the high order bits of the depth value retained by the high order Z-buffer memory and the low order bits of the depth value retained by the low order Z-buffer memory by using the depth value calculated by the depth value calculation section, and for, when a result of a comparison performed by the low order bit comparing section shows that a depth indicated by the low order bits of the depth value calculated by the depth value calculation section is shallower than a depth indicated by the low order bits of the depth value retained by the low order Z-buffer memory, updating the low order bits retained by the low order Z-buffer memory by using the depth value calculated by the depth value calculation section.

The present invention is also a three-dimensional shape drawing method for drawing a three-dimensional shape by using Z buffer algorithm, the three-dimensional shape drawing method comprising the steps of: calculating a depth value of a pixel to be drawn; reading, from a high order Z-buffer memory retaining high order bits of a depth value of a pixel to be displayed as a front face, the high order bits, the depth value being among depth values having been calculated at the step of calculating a depth value, and comparing the high order bits having been read with high order bits of the depth value calculated at the step of calculating a depth value; when the high order bits of the depth value calculated at the step of calculating a depth value are determined, at the step of comparing the high order bits, to have a same value as that of the high order bits of the depth value retained by the high order Z-buffer memory, reading, from a low order Z-buffer memory retaining low order bits of the depth value of the pixel to be displayed as the front face, the low order bits, the depth value being among the depth values having been calculated at the step of calculating a depth value, and comparing the low order bits having been read with low order bits of the depth value calculated at the step of calculating a depth value; and updating the high order bits of the depth value retained by the high order Z-buffer memory and the low order bits of the depth value retained by the low order Z-buffer memory by using the depth value calculated by the step of calculating a depth value when a depth indicated by the high order bits of the depth value calculated at the step of calculating a depth value is determined, at the step of comparing the high order bits, to be shallower than a depth indicated by the high order bits of the depth value retained by the high order Z-buffer memory, and updating the low order bits retained by the low order Z-buffer memory by using the depth value calculated at the step of calculating a depth value when a depth indicated by the low order bits of the depth value calculated at the step of calculating a depth value is determined, at the step of comparing the low order bits, to be shallower than a depth indicated by the low order bits of the depth value retained by the low order Z-buffer memory.

According to the present invention, a three-dimensional shape drawing device and a three-dimensional shape drawing method are provided which are capable of drawing a three-dimensional shape at a high speed.

DETAILED DESCRIPTION OF THE INVENTION

Hereinafter, an embodiment of the present invention will be described with reference to the drawings.

Figure 1:
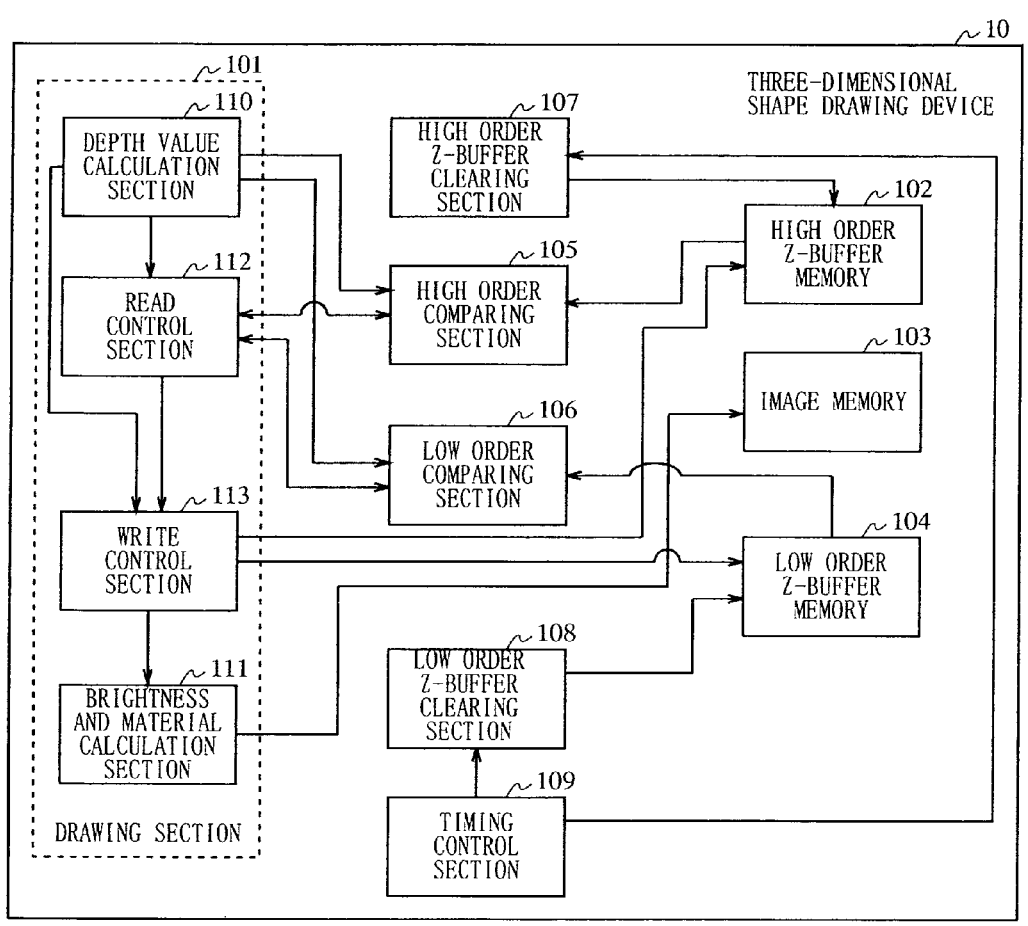
FIG. 1 is a functional block diagram showing a configuration of a three-dimensional shape drawing device according to an embodiment of the present invention.

FIG. 1 is a functional block diagram showing a configuration of a three-dimensional shape drawing device 10 according to the embodiment of the present invention. In FIG. 1, the three-dimensional shape drawing device 10 comprises a drawing section 101, a high order Z-buffer memory 102, an image memory 103, a low order Z-buffer memory 104, a high order bit comparing section 105, a low order bit comparing section 106, a high order Z-buffer clearing section 107 and a low order Z-buffer clearing section 108.

The image memory 103 stores data of an image which has been drawn by the drawing section 101, the image whose hidden surface having been removed. The high order Z-buffer memory 102 stores a depth value of a pixel to be displayed as a front face of the image. To be specific, the high order Z-buffer memory 102 stores high order bits of a depth value of each pixel stored in the image memory 103. The low order Z-buffer memory 104 also stores the depth value of the pixel to be displayed as the front face. To be specific, the low order Z-buffer memory 104 stores low order bits of the depth value of the each pixel stored in the image memory 103. For example, in the case where the depth value is represented as 24 bits, the high order Z-buffer memory 102 retains high order 8 bits of the depth value, and the low order Z-buffer memory 104 retains low order 16 bits of the depth value.

Controlled by a timing control section 109 is a timing of drawing a figure to show a next display when a previous display is completed. To be specific, at a timing when the figure should be drawn for the next display, the timing control section 109 instructs the high order Z-buffer clearing section 107 and the low order clearing section 108 to initialize the image memory 103, the high order Z-buffer memory 102 and the low order Z-buffer memory 104. Also, the timing control section 109 instructs the drawing section 101 to start drawing the figure at the timing when the figure should be drawn for the next display.

In response to the instruction from the timing control section 109, the high order Z-buffer clearing section 107 initializes the high order Z-buffer memory 102 and the image memory 103. Also, the low order Z-buffer clearing section 108 initializes the low order Z-buffer memory 104 in response to the instruction from the timing control section 109.

The high order bit comparing section 105 compares high order bits of a depth value received from a later-described depth value calculation section 110 with high order bits of a depth value read from the high order Z-buffer memory 102. The high order bits which the high order bit comparing section 105 reads from the high order Z-buffer memory 102 are high order bits of a depth value of a pixel which is in a same position as that of a pixel which the depth value calculation section 110 has used for calculation. Then, the high order bit comparing section 105 notifies a comparison result of the two sets of high order bits to a later-described read control section 112.

The low order bit comparing section 106 compares low order bits of the depth value received from the later-described depth value calculation section 110 with low order bits of the depth value read from the low order Z-buffer memory 104. The low order bits which the low order bit comparing section 106 reads from the low order Z-buffer memory 104 are low order bits of the depth value of the pixel which is in the same position as that of the pixel which the depth value calculation section 110 has used for the calculation. Then, the low order bit comparing section 106 notifies a comparison result of the two sets of low order bits to the later-described read control section 112.

The drawing section 101 includes the depth value calculation section 110, a brightness and material calculation section 111, a read control section 112 and a write control section 113. The drawing section 101 converts polygon data into pixel data.

The depth value calculation section 110 calculates a depth value of a pixel. Then, the depth value calculation section 110 sends the calculated depth value to the high order bit comparing section 105, the low order bit comparing section 106 and the write control section 113. Further, the depth value calculation section 110 generates a calculation notification signal for notifying that the depth value has been calculated, and sends the signal to the read control section 112. Note that, high order bits and low order bits are sent, together with positional information indicating a position of the depth value, to the high order bit comparing section 105 and the low order bit comparing section 106, respectively. The positional information may be, for example, coordinates. Hereinafter in the present embodiment, unless it is described differently, the depth value calculation section 110 sends the calculated depth value together with the positional information to the high order bit comparing section 105, the low order bit comparing section 106 and the control section 113.

Upon receiving the calculation notification signal, the read control section 112 instructs the high order bit comparing section 105 to compare the high order bits of the depth value calculated by the depth value calculation section 110 with the high order bits of the depth value retained by the high order Z-buffer memory 102. When a result of the comparison of the two sets of high order bits performed by the high order bit comparing section 105 shows that the high order bits of the depth value calculated by the depth value calculation section 110 are same as the high order bits of the depth value retained by the high order Z-buffer memory 102, the read control section 112 instructs the low order bit comparing section 106 to compare the low order bits of the depth value calculated by the depth value calculation section 110 with the low order bits of the depth value retained by the low order Z-buffer memory 104.

Based on notifications from the high order bit comparing section 105 and low order bit comparing section 106, the read control section 112 determines whether or not to update the depth value retained by the high order Z-buffer memory 102 and the low order Z-buffer memory 104. When a result of the comparison performed by the high order bit comparing section 105 shows that a depth indicated by the high order bits of the depth value calculated by the depth value calculation section 110 is shallower than a depth indicated by the high order bits of the depth value retained by the high order Z-buffer memory 102, the read control section 112 instructs a write control section 113 to update, with the high order bits and low order bits of the depth value calculated by the depth value calculation section 110, the high order bits of the depth value retained by the high order Z-buffer memory 102 and the low order bits retained by the low order Z-buffer memory 104.

Also, when a result of the comparison performed by the low order bit comparing section 106 shows that a depth indicated by the low order bits of the depth value calculated by the depth value calculation section 110 is shallower than a depth indicated by the low order bits of the depth value retained by the low order Z-buffer memory 104, the read control section 112 instructs the write control section 113 to update the low order bits retained by the low order Z-buffer memory 104 with the depth value calculated by the depth value calculation section 110.

In response to the instruction from the read control section 112, the write control section 113 updates either only the low order bits retained by the low order Z-buffer memory 104 or both the high order bits retained by the high order Z-buffer memory 102 and the low order bits retained by the low order Z-buffer memory 104. When the write control section 113 updates such a record retained by the high order Z-buffer memory 102 or the low order Z-buffer memory 104, the write control section 113 instructs the brightness and material calculation section 111 to calculate a brightness value and material value and writes these values in the image memory 103.

In response to the instruction from the write control section 113, the brightness and material calculation section 111 calculates, e.g., a brightness value indicating brightness of a pixel and a material value indicating a texture of a surface of the pixel. Then, the brightness and material calculation section 111 writes the calculated brightness value and material value in the image memory 103.

Figure 2:
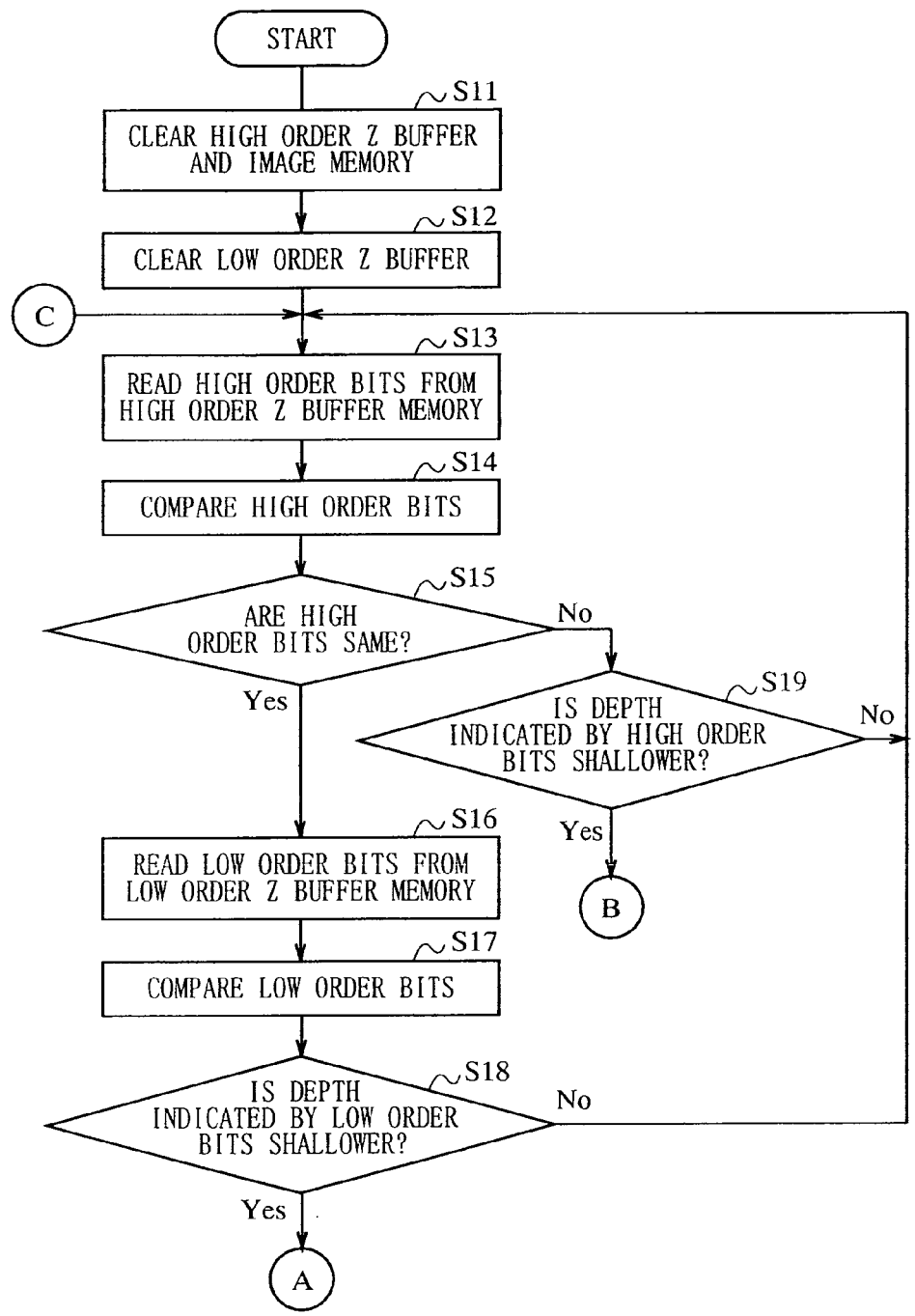
FIG. 2 is a diagram schematically showing a depth value retained by a high order Z-buffer memory 102 and a low order Z-buffer memory 104.
Figure 3:
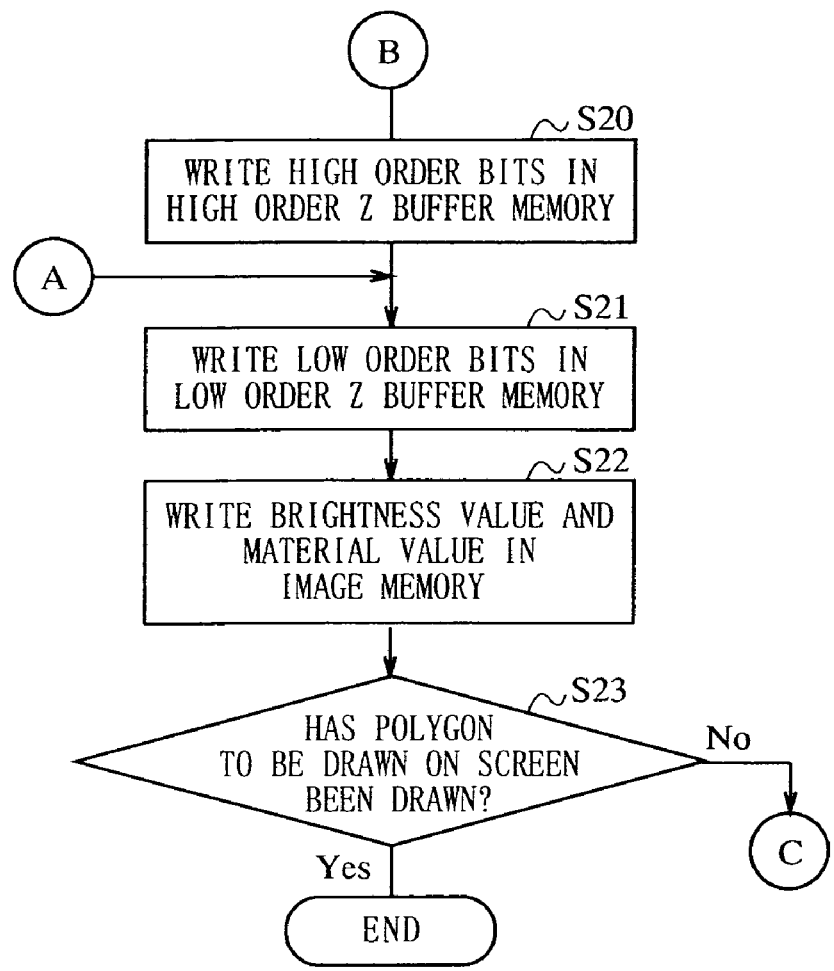
FIG. 3 is a flowchart showing operations of the three-dimensional shape drawing device shown in FIG. 1.

FIGS. 2 and 3 are flow charts showing operations of the three-dimensional shape drawing device 10 shown in FIG. 1. First, when a displaying process of a previous display is completed, the timing control section 109 instructs the high order Z-buffer clearing section 107 to initialize the image memory 103 and the high order Z-buffer memory 102. Then, the high order Z-buffer clearing section 107 initializes the high order Z-buffer memory 102 and the image memory 103, and overwrites, with an initial value, values retained by the high order Z-buffer memory 102 and the image memory (Step S11). The initial value is, for example, a depth value indicating a farthest point from a viewpoint. Hereinafter, an example will be described in which a depth value is represented in hexadecimal, and the depth value indicating the farthest point is 000000H in 24 bits. For example, when high order bits are 8 bits, the high order Z-buffer clearing section 107 initializes the high order Z-buffer memory 102 by using 00H at step S11.

Next, the timing control section 109 instructs the low order Z-buffer clearing section 108 to initialize the low order Z-buffer memory 104. The low order Z-buffer clearing section 108 then initializes the low order Z-buffer memory 104, and overwrites a value retained by the low order Z-buffer memory 104 with the initial value (step S12). For example, when low order bits are 16 bits, the low order Z-buffer clearing section 108 initializes the low order Z-buffer memory 104 by using 0000H at step S12.

The depth value calculation section 110 calculates a depth value Znow of each of pixels comprising a three-dimensional shape outputted from an image supply section (not shown in the figure), and sends the calculated value Znow to the high order bit comparing section 105, the low order bit comparing section 106 and the write control section 113. The depth value calculation section 110 also sends the calculation notification signal to the read control section 112. The read control section 112 instructs the high order bit comparing section 105 to compare high order bits of the depth value calculated by the depth value calculation section 110 with high order bits of a depth value retained by the high order Z-buffer memory 102.

Then, the high order bit comparing section 105 reads high order bits ZoldHI, i.e., the high order bits of the depth value retained by the high order Z-buffer memory 102 (step S13), and compares the high order bits ZoldHI with high order bits ZnowHI received from the depth value calculation section 110 (step S14). Then, the high order bit comparing section 105 notifies a result of the comparison to the read control section 112.

Upon receiving the result of the comparison performed by the high order bit comparing section 105, the read control section 112 determines based on the result of the comparison whether the high order bits of the depth value calculated by the depth value calculation section 110 are same as the high order bits of the depth value retained by the high order Z-buffer memory 102 (step S15). In the case where the two sets of high order bits are same, i.e., ZnowHI=ZoldHI, a positional relationship between pixels cannot be determined only based on the comparison of the high order bits. For this reason, the read control section 112 instructs the low order bit comparing section 106 to compare low order bits ZnowLo of the depth value calculated by the depth value calculation section 110 with low order bits of the depth value retained by the low order Z-buffer memory 104.

The low order bit comparing section 106 reads low order bits ZoldLO, i.e., the low order bits of the depth value retained by the low order Z-buffer memory 104 (step S16), and compares the low order bits ZoldLO with the low order bits ZnowLO received from the depth value calculation section 110, and notifies a result of the comparison to the read control section 112 (step S17).

The read control section 112 determines whether or not a depth indicated by low order bits of a depth value of a pixel to be newly drawn is shallower than a depth indicated by low order bits retained by the low order Z-buffer memory 104 (step S18). If an inequality ZnowLO>ZoldLo is satisfied, i.e., if the pixel to be newly drawn is positioned in front of a pixel having already been drawn, the read control section 112 proceeds to a process of step S21 of FIG. 3. If an inequality ZnowLO≦ZoldLO is satisfied, a process at the brightness and material calculation section 111 is not performed, and then the read control section 112 performs processes for a next pixel, i.e., proceeds to a process at step S13.

At step S21 of FIG. 3, the write control section 113 writes the low order bits ZnowLO in the low order Z-buffer memory 104.

Then, the write control section 113 instructs the brightness and material calculation section 111 to calculate a brightness value and a material value. The brightness and material calculation section 111 then calculates values Inow of the pixel, e.g., a brightness value Inow, and writes the values in the image memory 103 (step S22).

The read control section 112 determines whether or not a polygon drawing on a screen has been completed (step S23). If the polygon drawing has not been completed, the read control section 112 returns to the process at step S13. If the polygon drawing has been completed, i.e., if there is no more image data to be outputted from the image supply section, the read control section 112 terminates processing.

If the two sets of high order bits are not same at step S15, the read control section 112 determines whether or not a depth indicated by the high order bits of the depth value of the pixel to be newly drawn is shallower than a depth indicated by the high order bits retained by the high order Z-buffer memory 102 (step S19). If an inequality ZnowHI<ZoldHI is satisfied, i.e., if the pixel to be drawn next is positioned behind the pixel having already been drawn, the process at the brightness and material calculation section 111 is not performed, and then the read control section 112 performs processes for a next pixel. In this case, the read control section 112 proceeds to the process at step S13.

On the other hand, if an inequality ZnowHI>ZoldHI is satisfied, i.e., if the pixel to be newly drawn is positioned in front of the pixel having already been drawn, the read control section 112 instructs the write control section 113 to update the depth value retained by the high order Z-buffer memory 102 and the low order Z-buffer memory 104. The write control section 113 proceeds to a process at step S20 of FIG. 3, and writes the high order bits ZnowHI in the high order Z-buffer memory 102. Since processes performed after step S20 are same as those described above, descriptions thereof will be omitted.

Figure 4:
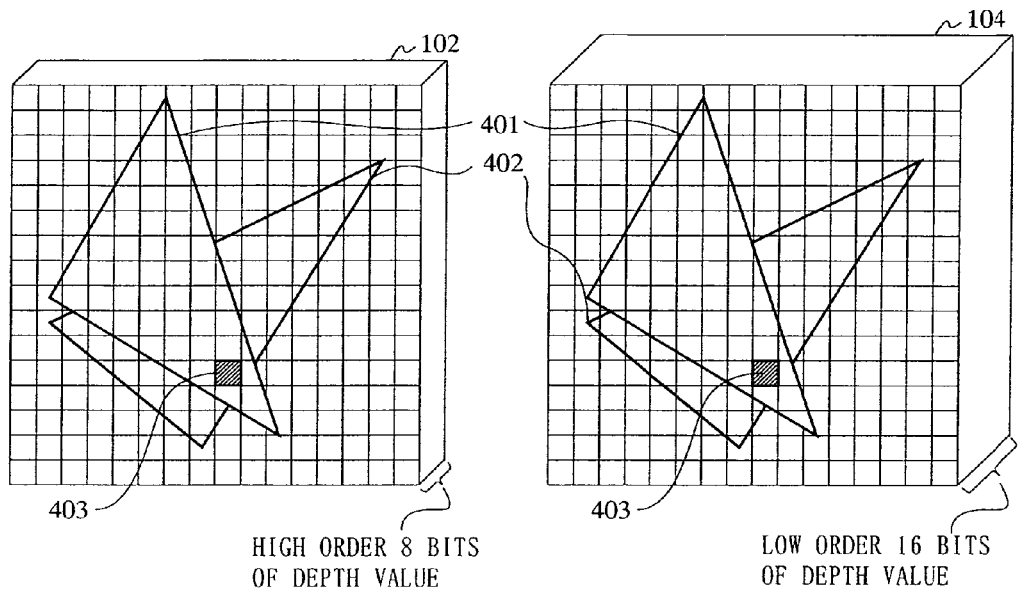
FIG. 4 is a flowchart showing a detailed process at subroutine step S19 shown in FIG. 3.

FIG. 4 is a diagram schematically showing depth values of FIGS. 401 and 402 retained by the high order Z-buffer memory 102 and the low order Z-buffer memory 104. In both the high order Z-buffer memory 102 and the low order Z-buffer memory 104, a pixel 403 is positioned at a same coordinate point. In order to simplify a description, an illustration showing the image memory 103 is omitted in FIG. 4.

In an example shown in FIG. 4, since the high order Z-buffer memory 102 retains high order 8 bits, and the low order Z-buffer memory 104 retains low order 16 bits, the high order Z-buffer clearing section 107 initializes a value retained by the high order Z-buffer memory 102 to 00H, and the low order Z-buffer clearing section 108 initializes a value retained by the low order Z-buffer memory 104 to 0000H. Note that, instead of having the high order Z-buffer clearing section 107 and the low order Z-buffer clearing section 108 which are dedicated to initializing the high order Z-buffer memory 102 and the low order Z-buffer memory 104, the drawing section 101 may have a function for overwriting the values retained by the high order Z-buffer memory 102 and low order Z-buffer memory 104 with the value 000000H indicating the farthest point.

Next, a description will be given by taking the pixel 403 shown in FIG. 4 as an example. First, the high order Z-buffer clearing section 107 initializes the high order Z-buffer memory 102 with the initial value 00H, and the low order Z-buffer clearing section 108 initializes the low order Z-buffer memory 104 with the initial value 0000H. Then, when the FIG. 401 is drawn, the high order bit comparing section 105 compares high order 8 bits Z401HI of a depth value of a position of the pixel 403 of the FIG. 401 with the initial value 00H retained by the high order Z-buffer memory 102. A result of the comparison shows that Z401HI is greater than the initial value, i.e., the position indicated by Z401HI is in front of a position indicated by the initial value. Therefore, the write control section 113 writes Z401HI in the high order Z-buffer memory 102, and writes Z401LO in the low order Z-buffer memory 104. The brightness and material calculation section 111 calculates the brightness value and material value of the pixel 403, and writes the values in the image memory 103.

Next, when the FIG. 402 is drawn, the high order bit comparing section 105 compares high order 8 bits Z402HI of a depth value of the position of the pixel 403 of the FIG. 402 with Z401HI of the depth value of the position of the pixel 403 of the FIG. 401 retained by the high order Z buffer memory 102. If Z402HI and Z401HI of the depth values are same, the read control section 112 instructs the low order bit comparing section 106 to compare low order bits of the depth values. Then, the low order bit comparing section 106 compares low order 16 bits Z402LO of the depth value of the position of the pixel 403 of the FIG. 402 with Z401LO retained by the low order Z-buffer memory 104. Since a result of the comparison is Z401LO>Z402LO, the values of the pixel 403 retained by the high order Z-buffer memory 102, the low order Z-buffer memory 104 and the image memory 103 are not updated. Then, a process for drawing a next pixel is begun.

As described above, according to the present embodiment, when a pixel data is drawn, only high order bits of depth values are compared first. Low order bits of the depth values are compared only when the high order bits of the depth values are same. Since only the high order bits of the depth values are compared first, bus traffic is reduced. As a result, fast drawing of a three-dimensional shape is realized. Note that, the bus traffic is represented as a product of the number of accesses to the memory and a bus width.

According to the present embodiment, a bus bandwidth can be reduced. Consequently, the fast drawing of the three-dimensional shape can be performed even with a limited bus width. Further, rendering of a pixel is performed only after hidden surface removal is completed. This allows drawing substantial number of figures even with low arithmetic capability.

The present embodiment gives the example in which the brightness and material calculation section 111 performs calculation only when the calculation is necessary after the comparison of depth values is completed. However, the calculation may be performed concurrently with the calculation performed by the depth value calculation section 110. Also, the processes at the depth value calculation section 110, the high order bit comparing section 105, the low order bit comparing section 106 and the brightness and material calculation section 111 may be performed by pipeline processing.

It is described in the present embodiment that the depth value of a pixel is represented as 24 bits in hexadecimal format, and the initial value of the depth value is 000000H. However, the initial value is not limited thereto. For example, the high order Z-buffer memory and the low order Z-buffer memory may be initialized by using 010000H as a value indicating the farthest point.

It is also described in the present embodiment that when drawing for the next display is begun, both the high order z-buffer memory and the low order Z-buffer memory are initialized. However, only the high order Z-buffer memory may be initialized by using a predetermined initial value, e.g., 00H or 11H. In this case, high order bits of depth values to be first compared by the high order bit comparing section are always written in the high order Z-buffer memory. At the same time, low order bits of the depth values are written in the low order Z-buffer memory. Thus, the initialization of the low order Z-buffer memory performed by the low order Z-buffer clearing section can be skipped. As a result, memory traffic is reduced. This allows drawing substantial number of figures even with low arithmetic capability.

Note that, the present embodiment gives the example in which the high order bits of a depth value are 8 bits, and the low order bits of the depth value are 16 bits, i.e., 24 bits in total. However, the total bit count, the number of high order bits and the number of low order bits may be arbitrarily set. Here, it is preferred that the number of high order bits is equal to or smaller than the number of low order bits, in order to reduce the amount of data to be read from the high order Z-buffer memory.

In the present embodiment, when the compared two sets of low order bits are same, the low order bits retained by the low order Z buffer are not updated. Alternatively, when the compared two sets of low order bits are same, the brightness value and the material value retained by the image memory as well as the low order bits retained by the low order Z buffer may be updated.

It is also described in the present embodiment that the high order Z-buffer memory and the low order Z-buffer memory are two memories which are physically separable. However, one memory may function as both the high order Z-buffer memory and the low order Z-buffer memory. In this case, high order bits and low order bits are separately recorded at different addresses of one memory.

If it is determined that a depth indicated by high order bits of a depth value calculated by the depth value calculation section is shallower than a depth indicated by high order bits of a depth value retained by the high order Z-buffer memory, the high order bit comparing section may add a flag to the high order bits of the depth value calculated by the depth value calculation section, and if it is determined that a depth indicated by low order bits of the depth value calculated by the depth value calculation section is shallower than a depth indicated by low order bits of the depth value retained by the low order Z-buffer memory, the low order bit comparing section may add a flag to the low order bits of the depth value calculated by the depth value calculation section. Here, when the flag is added to the high order bits of the depth value calculated by the depth value calculation section, the write control section may update the high order bits of the depth value retained by the high order Z-buffer memory and the low order bits of the depth value retained by the low order Z-buffer memory, and when the flag is added to the low order bits of the depth value calculated by the depth value calculation section, the write control section may update either only the low order bits of the depth value retained by the low order Z-buffer memory or both the high order bits of the depth value retained by the high order Z-buffer memory and the low order bits of the depth value retained by the low order Z-buffer memory.

EXAMPLE

Figure 5:
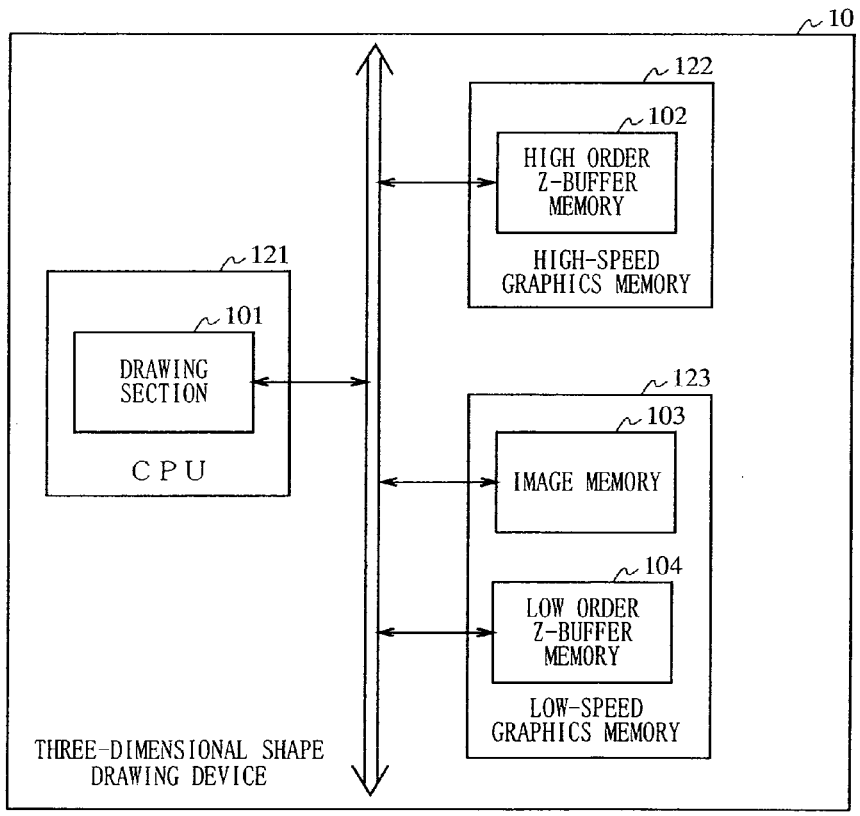
FIG. 5 is a block diagram showing an exemplary hardware configuration of the three-dimensional shape drawing device.

Next, an example of the present invention will be described. FIG. 5 is a block diagram showing a hardware configuration of the three-dimensional shape drawing device 10. The three-dimensional shape drawing device 10 comprises a CPU 121, a high-speed graphics memory 122 and a low-speed graphics memory 123, the CPU 121 implementing a function of the drawing section 101. Note that, functions of the high order bit comparing section 105, the low order bit comparing section 106, the high order z-buffer clearing section 107, the low order Z-buffer clearing section 108 and the timing control section 109 are also implemented by the CPU. However, in FIG. 5, only the drawing section 101 is illustrated as a representative example.

Since a functional block diagram of the three-dimensional shape drawing device 10 of FIG. 5 is identical with FIG. 1 of the above-described embodiment, FIG. 1 will be used as a reference. Also, since operations of the three-dimensional shape drawing device 10 of FIG. 5 are identical with those illustrated in FIG. 2 of the above embodiment, FIG. 2 will be used as a reference.

The high-speed graphics memory 122 includes the high order Z-buffer memory 102, and is, for example, a SRAM (Static Random Access Memory) or an ASIC embedded memory. The low-speed graphics memory 123 includes the image memory 103 and low order Z-buffer memory 104, and is, for example, a DRAM (Dynamic Random Access Memory).

High-speed processing is realized by using the high-speed graphics memory being capable of high-speed processing as the high order Z-buffer memory which is accessed more frequently than the low order Z-buffer memory and image memory. Since the high order Z-buffer memory is only required to retain high order 8 bits of a depth value, a necessary size of the high-speed graphics memory can be kept small. Moreover, a processing speed of the three-dimensional shape drawing device can be enhanced with a minimum increase in cost, by including, in the low-speed graphics memory which has a large capacity but is low-speed, the low order Z-buffer memory and the image memory which are accessed less frequently than the high order Z-buffer memory.

In the case where a three-dimensional shape is drawn by using an arithmetic unit such as a DSP, calculations of brightness value and other values are performed when a record kept in the high order Z-buffer memory or the low order Z-buffer memory is updated. This allows the three-dimensional shape drawing device of the present invention to draw more three-dimensional shapes than a conventional three-dimensional shape drawing device within a same time period, even if the arithmetic unit has a same capability as that of an arithmetic unit of the conventional three-dimensional shape drawing device.

It is described in this example that the functions of the drawing section, the high order bit comparing section, the low order bit comparing section, the high order Z-buffer clearing section, the low order Z-buffer clearing section and the timing control section are implemented by the CPU. However, the functions of these sections are not necessarily implemented by the CPU. A function of each section may be implemented by a LSI executing a program for the function.

Although it is described in this example that the image memory and the low order Z-buffer memory are embedded in the three-dimensional shape drawing device, these memories do not necessarily have to be embedded in the three-dimensional shape drawing device.

Figure 6:
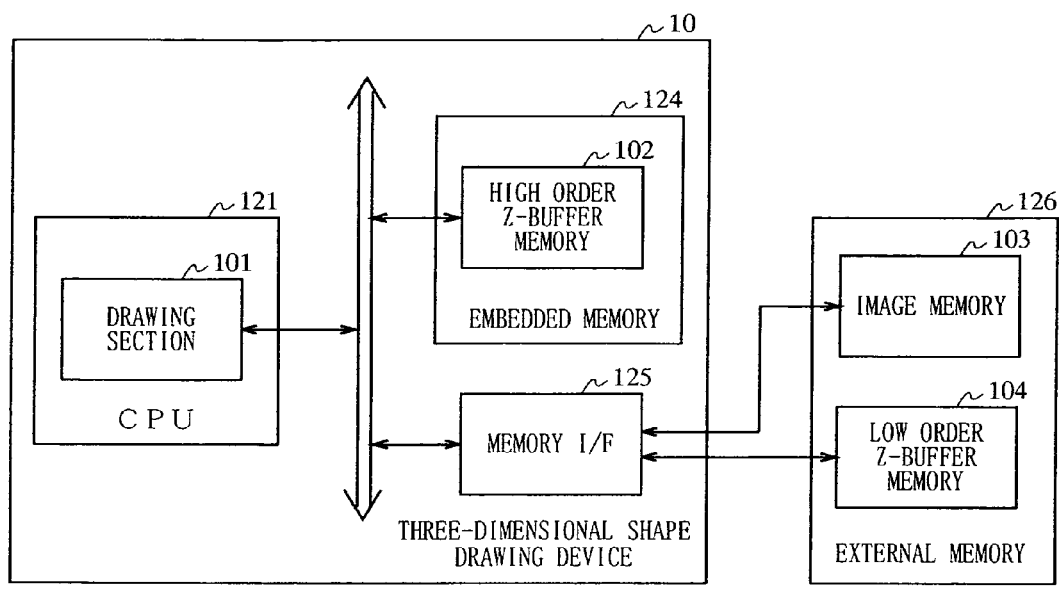
FIG. 6 is a block diagram showing an exemplary hardware configuration of the three-dimensional shape drawing device.
Figure 7:
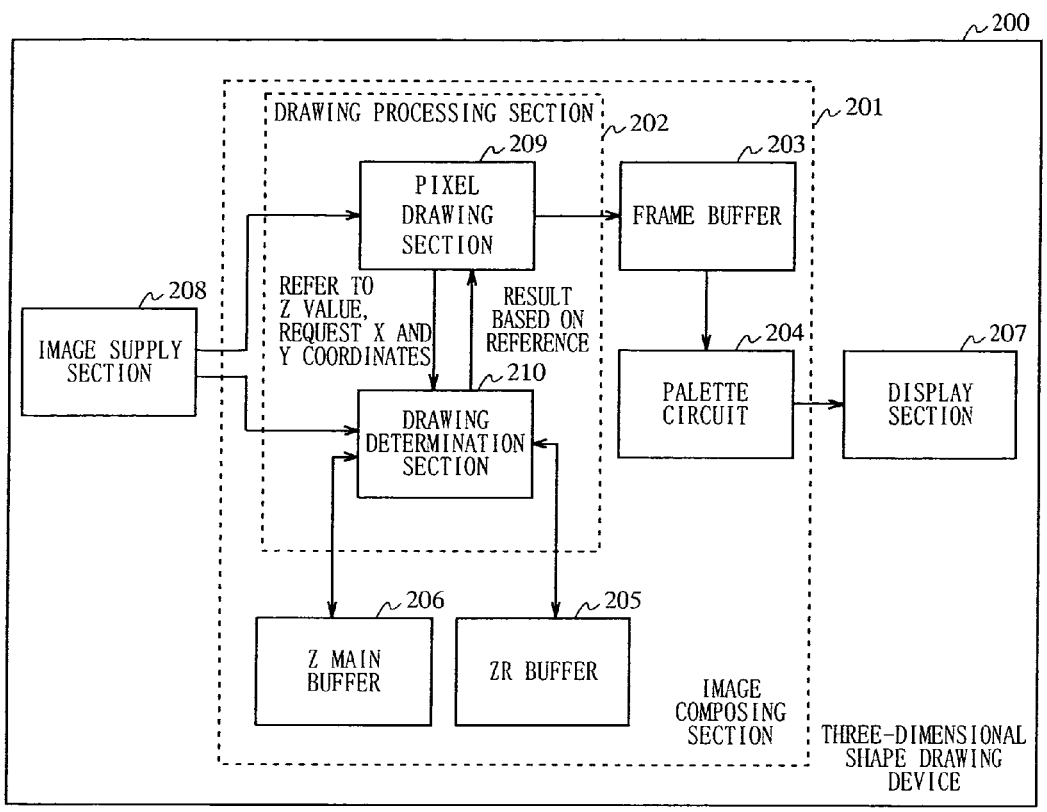
FIG. 7 is a block diagram showing a configuration of a three-dimensional shape drawing device 200 described in a patent document 2.
Figure 8:
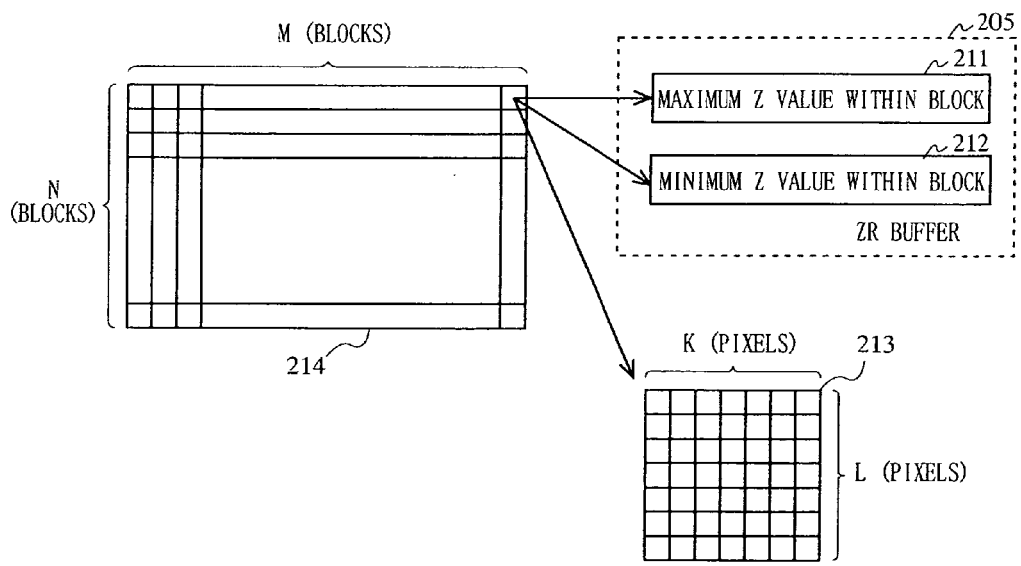
FIG. 8 schematically shows a screen 214 for displaying a three-dimensional shape drawn by the three-dimensional shape drawing device of FIG. 7 and a configuration of a ZR buffer 205.

FIG. 6 is a block diagram showing a hardware configuration of the three-dimensional shape drawing device 10 in the case where the image memory 103 and the low order Z-buffer memory 104 are external memories. In FIG. 6, the three-dimensional shape drawing device comprises the CPU 121, an embedded memory 124 and a memory I/F 125, the CPU 121 implementing the function of the drawing section 101.

The memory I/F 125 controls an access by the drawing section 101 to the image memory 103 and the low order Z-buffer memory 104 which are included in an external memory 126.

Since the image memory and the low order Z-buffer memory are accessed less frequently than the high order Z-buffer memory, the image memory and the low order Z-buffer memory may be provided as external memories. Thus, a size of an embedded memory of the three-dimensional shape drawing device can be reduced.

The present invention is useful as a three-dimensional shape drawing device and a three-dimensional shape drawing method for drawing a three-dimensional shape at a high speed.

The invention claimed is:

1. A three-dimensional shape drawing device for drawing a three-dimensional shape using a Z-buffer algorithm, the three-dimensional shape drawing device comprising:

a depth value calculation section for calculating a depth value of a pixel to be drawn;

a high order Z-buffer memory for retaining high order bits of a depth value of a pixel to be displayed as a front face, the depth value of the pixel to be displayed as the front face being from among depth values calculated by the depth value calculation section;

a low order Z-buffer memory for retaining low order bits of the depth value of the pixel to be displayed as the front face, a number of the low order bits retained in the low order Z-buffer memory being equal to or larger than a number of the high order bits retained in the high order Z-buffer memory;

a high order bit comparing section for reading the high order bits retained by the high order Z-buffer memory and comparing the read high order bits with high order bits of the depth value calculated by the depth value calculation section;

a low order bit comparing section for, when a result of the comparing performed by the high order bit comparing section indicates that the high order bits of the depth value calculated by the depth value calculation section have a same value as the high order bits of the depth value of the pixel to be displayed as the front face and retained by the high order Z-buffer memory, (i) reading the low order bits of the depth value of the pixel to be displayed as the front face and retained by the low order Z-buffer memory and (ii) comparing the read low order bits with low order bits of the depth value calculated by the depth value calculation section;

a record update section for, when the result of the comparing performed by the high order bit comparing section indicates that a depth indicated by the high order bits of the depth value calculated by the depth value calculation section is shallower than a depth indicated by the high order bits of the depth value of the pixel to be displayed as the front face and retained by the high order Z-buffer memory, updating (i) the high order bits of the depth value of the pixel to be displayed as the front face and retained by the high order Z-buffer memory and (ii) the low order bits of the depth value of the pixel to be displayed as the front face and retained by the low order Z-buffer memory, by using the depth value calculated by the depth value calculation section, and for, when a result of a comparison performed by the low order bit comparing section indicates that a depth indicated by the low order bits of the depth value calculated by the depth value calculation section is shallower than a depth indicated by the low order bits of the depth value of the pixel to be displayed as the front face and retained by the low order Z-buffer memory, updating the low order bits of the depth value of the pixel to be displayed as the front face and retained by the low order Z-buffer memory by using the depth value calculated by the depth value calculation section;

a pixel value calculation section for calculating a pixel value, which is information about the pixel to be drawn;

an image memory for retaining the pixel value calculated by the pixel value calculation section;

a high order Z-buffer clearing section for clearing the high order Z-buffer memory by initializing the depth value of the pixel to be displayed as the front face and retained by the high order Z-buffer memory with a predetermined value; and a low order Z-buffer clearing section for clearing the low order Z-buffer memory by initializing the depth value of the pixel to be displayed as the front face and retained by the low order Z-buffer memory, wherein the high order bits of the depth value of the pixel to be displayed as the front face and retained by the high order Z-buffer memory and the low order bits of the depth value of the pixel to be displayed as the front face and retained by the low order Z-buffer memory are separately initialized upon clearing the high order Z-buffer memory via the high order Z-buffer clearing section and the low order Z-buffer memory via the low order Z-buffer clearing section, wherein the predetermined value indicates one of a shallowest depth value and a deepest depth value, such that, when the predetermined value is not the deepest depth value, the predetermined value is the shallowest depth value, and wherein the pixel value calculation section calculates the pixel value when the result of the comparing performed by the high order bit comparing section indicates that the depth indicated by the high order bits of the depth value calculated by the depth value calculation section is shallower than the depth indicated by the high order bits of the depth value of the pixel to be displayed as the front face and retained by the high order Z-buffer memory and when the result of the comparing performed by the low order bit comparing section indicates that the low order bits of the depth value calculated by the depth value calculation section have a same value as the low order bits of the depth value of the pixel to be displayed as the front face and retained by the low order Z-buffer memory.

2. The three-dimensional shape drawing device according to claim 1, wherein the low order bit comparing section updates the low order bits of the depth value of the pixel to be displayed as the front face and retained by the low order Z-buffer memory when the low order bits calculated by the depth value calculation section have a same value as the low order bits of the depth value of the pixel to be displayed as the front face and retained by the low order Z-buffer memory.

3. The three-dimensional shape drawing device according to claim 1, wherein, when the result of the comparing performed by the low order bit comparing section indicates that the low order bits calculated by the depth value calculation section have a same value as the low order bits of the depth value of the pixel to be displayed as the front face and retained by the low order Z-buffer memory, the high order bit comparing section performs, for a next pixel, a comparison of high order bits of depth values.

4. The three-dimensional shape drawing device according to claim 1, wherein, when the depth indicated by the high order bits of the depth value calculated by the depth value calculation section is determined to be shallower than the depth indicated by the high order bits of the depth value of the pixel to be displayed as the front face and retained by the high order Z-buffer memory, the high order bit comparing section adds a flag to the high order bits of the depth value calculated by the depth value calculation section, wherein, when the depth indicated by the low order bits of the depth value calculated by the depth value calculation section is determined to be shallower than the depth indicated by the low order bits of the depth value of the pixel to be displayed as the front face and retained by the low order Z-buffer memory, the low order bit comparing section adds a flag to the low order bits of the depth value calculated by the depth value calculation section, and wherein, when the flag is added to the high order bits of the depth value calculated by the depth value calculation section, the record update section updates the high order bits of the depth value of the pixel to be displayed as the front face and retained by the high order Z-buffer memory and the low order bits of the depth value of the pixel to be displayed as the front face and retained by the low order Z-buffer memory, and when the flag is added to the low order bits of the depth value calculated by the depth value calculation section, the record update section updates either (i) only the low order bits of the depth value of the pixel to be displayed as the front face and retained by the low order Z-buffer memory, or (ii) both the high order bits of the depth value of the pixel to be displayed as the front face and retained by the high order Z-buffer memory and the low order bits of the depth value of the pixel to be displayed as the front face and retained by the low order Z-buffer memory.

5. The three-dimensional shape drawing device according to claim 1, wherein the high order bits and the low order bits are respectively stored in the high order Z-buffer memory and the low order Z-buffer memory which is physically separated from the high order Z-buffer memory.

6. The three-dimensional shape drawing device according to claim 1, wherein the high order bits and the low order bits are respectively stored in the high order Z-buffer memory and the low order Z-buffer memory which has a same physical configuration as the high order Z-buffer memory.

7. The three-dimensional shape drawing device according to claim 1, wherein the predetermined value is the shallowest depth value.

8. A three-dimensional shape drawing method for drawing a three-dimensional shape using a Z-buffer algorithm, the three-dimensional shape drawing method comprising:

calculating a depth value of a pixel to be drawn;

reading high order bits from a high order Z-buffer memory retaining high order bits of a depth value of a pixel to be displayed as a front face, the depth value of the pixel to be displayed as the front face being from among depth values calculated by the calculating of the depth value, and comparing the high order bits read by the reading with high order bits of the depth value calculated by the calculating of the depth value of the pixel to be drawn;

when the high order bits of the depth value calculated by the calculating of the depth value are determined, by the comparing of the high order bits, to have a same value as the high order bits of the depth value of the pixel to be displayed as the front face and retained by the high order Z-buffer memory, (i) reading low order bits from a low order Z-buffer memory retaining low order bits of the depth value of the pixel to be displayed as the front face, a number of the low order bits retained in the low order Z-buffer memory being equal to or larger than a number of the high order bits retained in the high order Z-buffer memory, and the depth value of the pixel to be displayed as the front face being from among the depth values calculated by the calculating of the depth value, and (ii)

comparing the read low order bits with low order bits of the depth value calculated by the calculating of the depth value;

updating the high order bits of the depth value of the pixel to be displayed as the front face and retained by the high order Z-buffer memory and the low order bits of the depth value of the pixel to be displayed as the front face and retained by the low order Z-buffer memory, using the depth value calculated by the calculating of the depth value, when a depth indicated by the high order bits of the depth value calculated by the calculating of the depth value is determined, by the comparing of the high order bits, to be shallower than a depth indicated by the high order bits of the depth value of the pixel to be displayed as the front face and retained by the high order Z-buffer memory, and updating the low order bits of the depth value of the pixel to be displayed as the front face and retained by the low order Z-buffer memory using the depth value calculated by the calculating of the depth value, when a depth indicated by the low order bits of the depth value calculated by the calculating of the depth value is determined, by the comparing of the low order bits, to be shallower than a depth indicated by the low order bits of the depth value of the pixel to be displayed as the front face and retained by the low order Z-buffer memory, calculating a pixel value, which is information about the pixel to be drawn;

retaining, in an image memory, the pixel value calculated by the calculating of the pixel value;

clearing the high order Z-buffer memory via a high order Z-buffer clearing section initializing the depth value of the pixel to be displayed as the front face and retained by the high order Z-buffer memory with a predetermined value; and clearing the low order Z-buffer memory via a low order Z-buffer clearing section initializing the depth value of the pixel to be displayed as the front face and retained by the low order Z-buffer memory, wherein the high order bits of the depth value of the pixel to be displayed as the front face and retained by the high order Z-buffer memory and the low order bits of the depth value of the pixel to be displayed as the front face and retained by the low order Z-buffer memory are separately initialized upon clearing the high order Z-buffer memory via the clearing of the high order Z-buffer memory and the low order Z-buffer memory via the clearing of the low order Z-buffer memory, wherein the predetermined value indicates one of a shallowest depth value and a deepest depth value, such that, when the predetermined value is not the deepest depth value, the predetermined value is the shallowest depth value, and wherein the calculating of the pixel value calculates the pixel value when a result of the comparing of the high order bits indicates that the depth indicated by the high order bits of the depth value calculated by the calculating of the depth value is shallower than the depth indicated by the high order bits of the depth value of the pixel to be displayed as the front face and retained by the high order Z-buffer memory and when a result of the comparing of the low order bits indicates that the low order bits of the depth value calculated by the calculating of the depth value have a same value as the low order bits of the depth value of the pixel to be displayed as the front face and retained by the low order Z-buffer memory.

9. The three-dimensional shape drawing method according to claim 8, wherein when, at the comparing of the low order bits, the low order bits calculated by the calculating of the depth value are determined to have a same value as the low order bits of the depth value of the pixel to be displayed as the front face and retained by the low order Z-buffer memory, the low order bits of the depth value of the pixel to be displayed as the front face and retained by the low order Z-buffer memory are updated.

10. The three-dimensional shape drawing method according to claim 8, wherein when, at the comparing of the low order bits, the low order bits calculated by the calculating of the depth value are determined to have a same value as the low order bits of the depth value of the pixel to be displayed as the front face and retained by the low order Z-buffer memory, a comparison of high order bits of depth values is performed for a next pixel.

* * * * *